(12) United States Patent  (10) Patent No.: US 6,719,086 B1
Kemp  (45) Date of Patent: Apr. 13, 2004

(54) VARIABLE SPEED FRICTION DRIVE FOR LAWNMOWER

(76) Inventor: Jonathan Melven Kemp, 65013 Hwy. 51, Roseland, LA (US) 70456

( * ) Notice: Subject to any disclaimer, the term of this patent is extended or adjusted under 35 U.S.C. 154(b) by 105 days.

(21) Appl. No.: 10/037,181

(22) Filed: Oct. 23, 2001

Related U.S. Application Data

(60) Provisional application No. 60/246,514, filed on Nov. 6, 2000.

(51) Int. Cl.[7] .............................................. B60K 17/00
(52) U.S. Cl. ...................................................... 180/342
(58) Field of Search ................................ 180/342, 343, 180/347, 357, 348; 476/67, 68, 469, 24, 55, 56, 57, 58; 301/201

(56) References Cited

U.S. PATENT DOCUMENTS

| | | | | |
|---|---|---|---|---|
| 3,613,814 A | * | 10/1971 | Prien, Jr. ........................ 180/9 |
| 3,678,770 A | * | 7/1972 | Enters et al. .................. 476/19 |
| 4,020,619 A | * | 5/1977 | Massaro ....................... 56/11.2 |
| 4,498,552 A | * | 2/1985 | Rouse ......................... 180/368 |
| 4,502,344 A | * | 3/1985 | Klug ............................ 476/66 |
| 5,353,578 A | * | 10/1994 | Irby et al. .................... 56/11.1 |
| 6,502,335 B2 | * | 1/2003 | Prochnow et al. ............. 37/244 |

* cited by examiner

*Primary Examiner*—Paul N. Dickson
*Assistant Examiner*—Faye M. Fleming

(57) ABSTRACT

A drive system for propelling a lawnmower which includes a chassis, a driveshaft, a pair of ground engaging wheels and means for moving the ground engaging wheels into direct contact with the driveshaft. The driveshaft is mounted firmly in the chassis, allowing the use of a variable speed transmission that rotates the driveshaft at different speeds; the selection of these speeds to be controlled by the operator. The ground engaging wheels are moved by the operator into direct contact with the driveshaft to accomplish the propulsion of the lawnmower.

1 Claim, 3 Drawing Sheets

VARIABLE SPEED FRICTION DRIVE FOR LAWNMOWER

This application claims the benefit of provisional application No. 60/246,514, filed Nov. 6, 2000.

FEDERALLY SPONSORED RESEARCH

Not Applicable

SEQUENCE LISTING OR PROGRAM

Not Applicable

BACKGROUND

1. Field of Invention

This invention relates to friction drive transmissions.

2. Description of Prior Art

Present and prior walk-behind lawnmowers that use large rear wheels (commonly referred to as high-wheel mowers) use a drive system consisting of a rotating cog shaft or driveshaft that directly engages a pair of rear wheels.

In the disengaged position the driveshaft does not contact the rear tires. To engage the drive the driveshaft is moved into the rear tires. The driveshaft is mounted on a pair of bearing supports that pivot on one end to allow for this movement into the rear tires.

Present and prior constructions use a complex belt and roller chain arraignment to rotate the driveshaft and allow for a linear movement of the driveshaft assembly that is required to move the driveshaft into the tires.

The present and prior drive system does not allow for a multiple speed transmission. Changing the ground speed of a mower utilizing this present and prior system requires that the mower be stopped and disassembled to replace certain parts, changing the ratio between rotating parts.

The present system of moving the driveshaft cogs into the wheels does not lend itself to utilization of a friction drive, as a friction wheel must not be moved in a front-rear direction that was heretofore necessary to facilitate engagement between driveshaft and wheel.

I have not found any prior art in the patent records, therefore I have included an informal drawing of the present and prior art FIG. 1.

Operation; Prior Art

An engine 36 rotates a main pulley 42 via a main belt 30. This rotation is transferred into a twisted drive belt 44. Twisted drive belt 44 rotates a jackshaft 46. Jackshaft 46 rotates a driveshaft 20 via a drive chain 48. Driveshaft 20 is mounted on a pair of driveshaft supports 50. The lower end of driveshaft supports 50 is allowed to pivot on a pair of pivot bolts 52. A pair of drive cogs 26 are attached directly to driveshaft 20. To propel the mower the entire driveshaft 20 is pulled into a pair of ground engaging wheels 24 via an engagement rod 54; causing the ground engaging wheels 24 to rotate and propel the mower.

Reference Numerals in FIG. 1 Prior Art 20 driveshaft
22 driveshaft bearing
24 ground engaging wheels
26 cog
30 main belt
36 engine
42 main pulley
44 twisted belt
46 jackshaft
48 drive chain
50 driveshaft supports
52 pivot bolts
54 engagement rod

Objects and Advantages

Accordingly, several objects and advantages of the present invention are:

(a) to provide a drive system that will easily allow multiple drive ratios (ground speeds);
(b) to provide a drive system that will allow ratios to be changed while in operation;
(c) to provide a drive system that is simple to manufacture;
(d) to provide a drive system that is easy and simple to use and maintain;
(e) to provide a drive system with fewer moving parts;
(f) to provide a drive system that utilizes a friction drive;

Further objects and advantages will become apparent from a consideration of the ensuing description and drawings.

SUMMARY

The present invention provides a multi-ratio friction wheel drive system suitable for use on high-wheel lawnmowers and other small vehicles.

DRAWINGS

Drawing Figures

Figure 1:
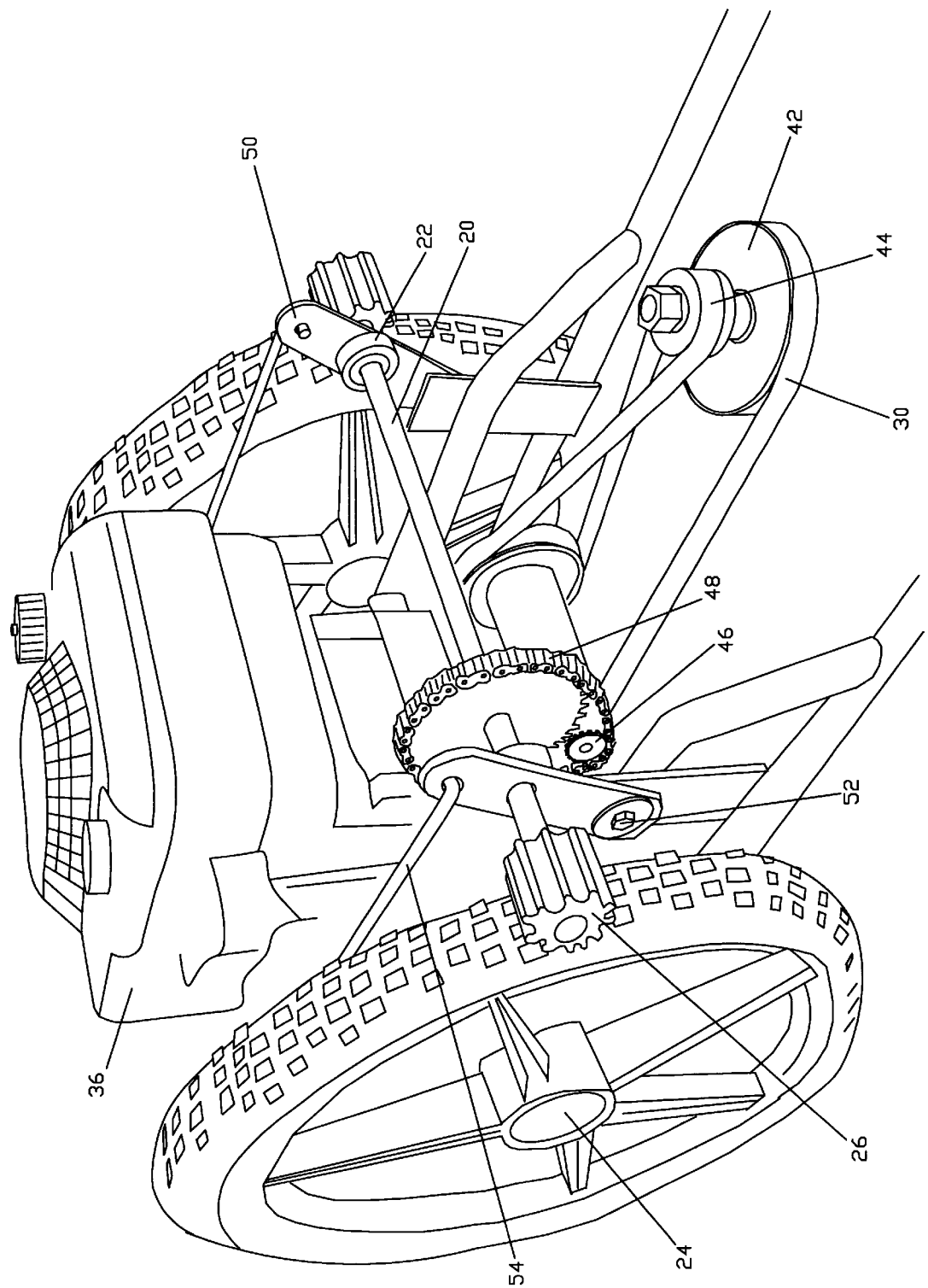
FIG. 1 shows prior art

REFERENCE NUMERALS IN DRAWINGS 20 driveshaft
22 driveshaft bearing
24 ground engaging wheel
26 cog
28 friction wheel
30 belt
31 hanger rod
32 drive plate
33 drive plate hanger
34 wheel support
34A wheel support in engaged position
35 pillow bearings
36 engine
37 shift control cable
38 engagement lever
40 main chassis
42 main pulley
44 twisted drive belt
46 jackshaft
48 drive chain
50 driveshaft supports
52 pivot bolts
54 engagement rod Please note that numbers 42 through 54 are present in FIG. 1 prior art only.

DETAILED DESCRIPTION

Figure 2:
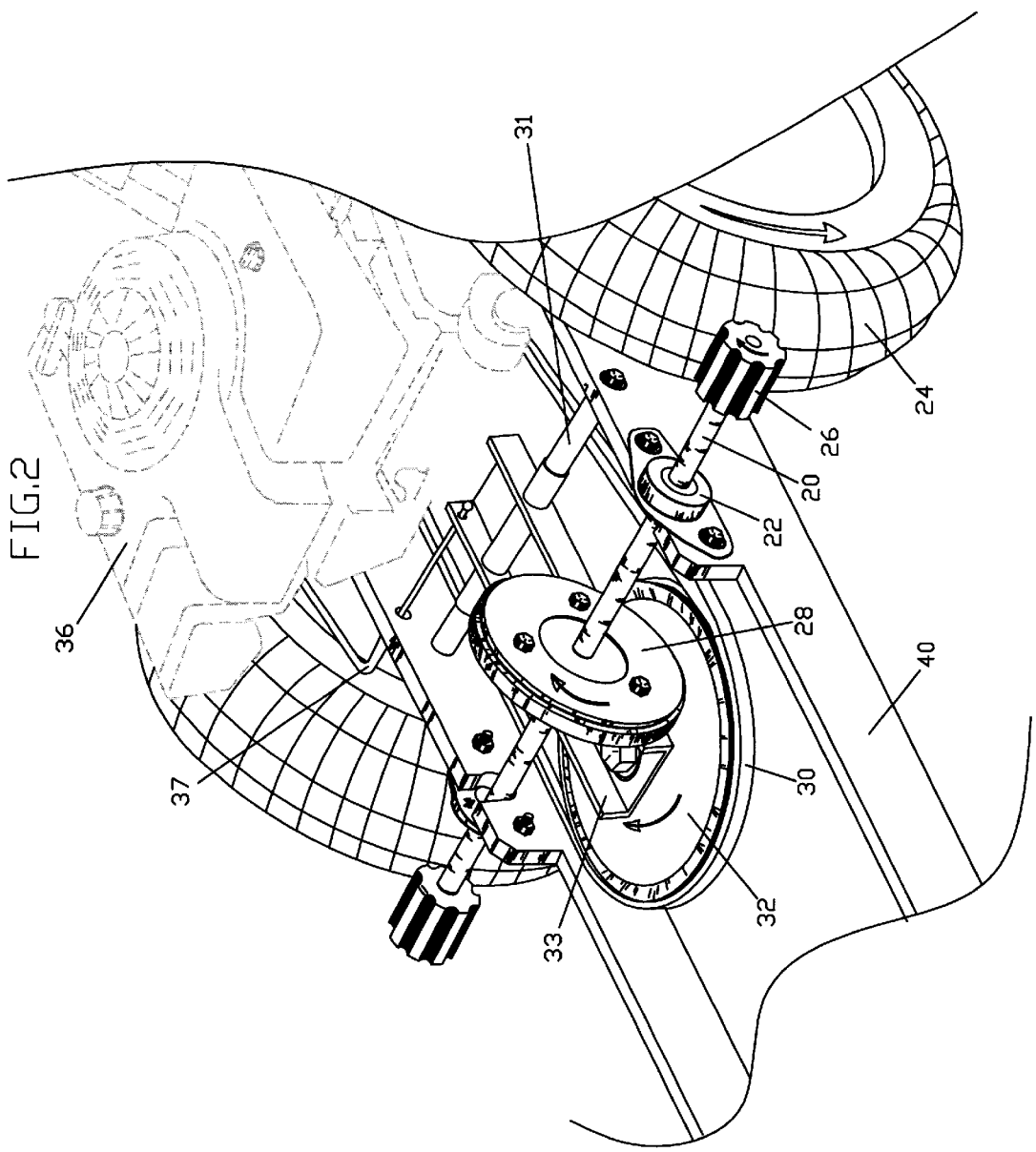
FIG. 2 shows an isometric view of the drive system.

Description—FIGS. 1 and 2—Preferred Embodiment

Figure 3:
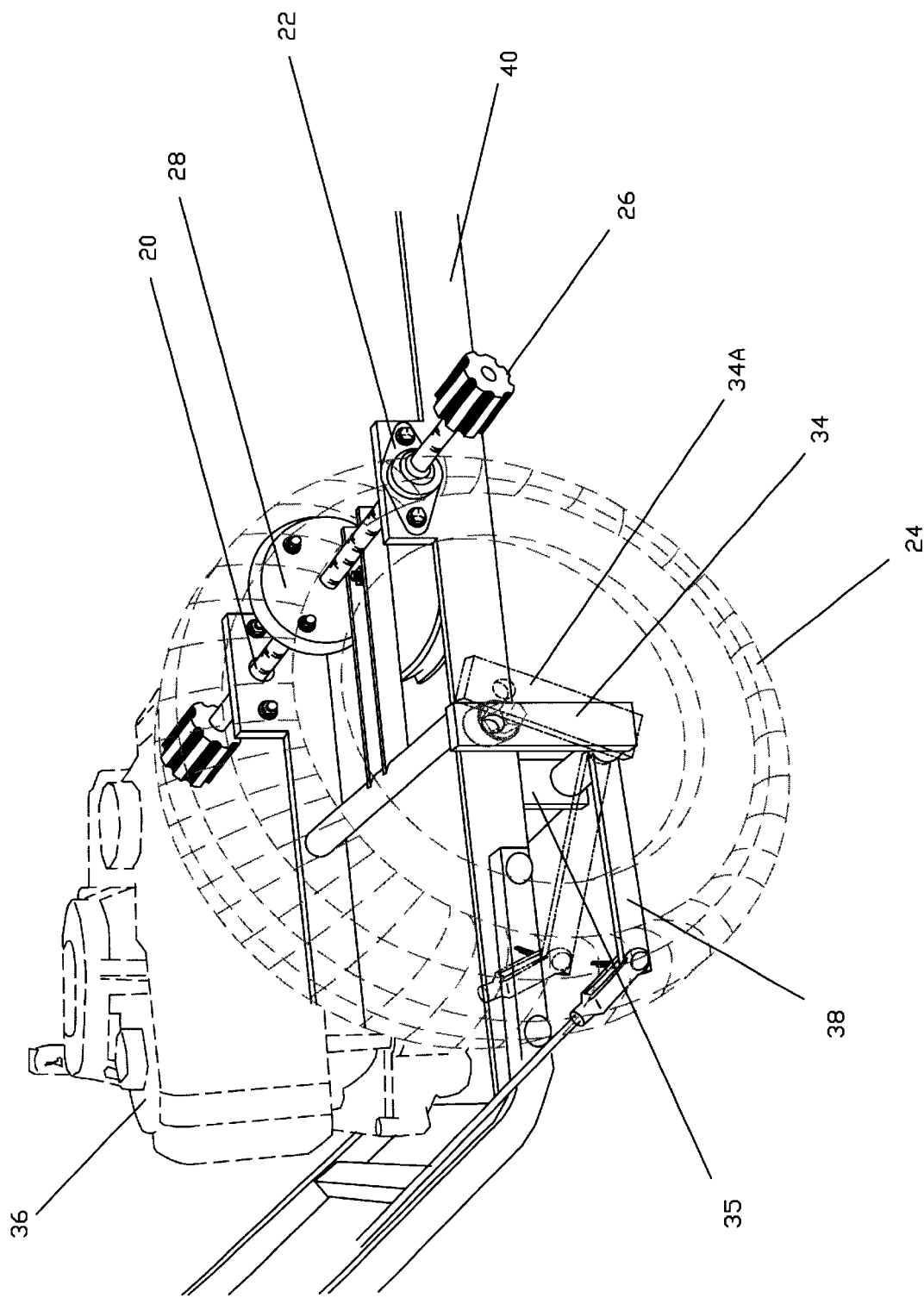
FIG. 3 shows an end view of the drive system with right wheel transparent for better detail of the axle arrangement.

A preferred embodiment of the invention is illustrated in FIG. 2 (isometric view) and FIG. 3 (end view). The drive system has a drive plate 32 constructed of metal or some similarly durable material and rotated by a belt 30. A friction wheel 28 is attached directly to a driveshaft 20 and comes into direct contact with drive plate 32. Drive plate 32 is attached to a drive plate hanger 33. The drive plate hanger 33 is allowed to slide laterally on a hanger rod 31 thereby altering the distance from the center of drive plate 32 and the contact patch of friction wheel 28. A shift control cable 37 is connected to drive plate hanger 33 to facilitate this lateral movement.

Friction wheel 28 has an outer circumference composed of a material that has a high co-efficient of friction; typically SBR rubber. Two cogs 26 are attached to the ends of the driveshaft 20 in close proximity with the ground engaging wheels 24. Driveshaft 20 is allowed to rotate in a pair of driveshaft bearings 22. Driveshaft bearings 22 are mounted rigidly to a main chassis 40. A pair of ground engaging wheels 24 are attached to a wheel support 34. The wheel support 34 is rotatably mounted in pillow bearings 35 to allow for rotation movement. An engagement lever 38 is attached directly to wheel support 34 to facilitate rotational movement. Wheel support 34 is designed in such a way that rotation of wheel support 34 pivots the ground engaging wheels 24 forward into cogs 26. Ground engaging wheels 24 are shown in an engaged position 34

Alternative Embodiments

There are various possibilities with regard to the manner in which the ratio between the drive plate and the friction wheel could be altered. The friction wheel could be mounted on the driveshaft in such a way that the friction wheel could be moved laterally on said driveshaft, leaving the drive plate stationary relative to the chassis. Also possible would be the lateral movement of the entire driveshaft and friction wheel, again leaving the drive plate stationary relative to the chassis.

Also possible would be the substitution of a gear or pulley arraignment instead of a cog on the end of the driveshaft.

Advantages

From the description above, a number of advantages of my drive system become evident:

(a) The drive system is simple to manufacture, maintain and operate.
(b) The drive system allows for variable ratios as the distance between the center of the drive plate and the contact point of the friction wheel is easily altered by the operator during operation.

Operation—FIGS. 2, 3

Under use, the engine 36 rotates drive plate 32 via belt 30. This rotation is transferred into friction wheel 28 by virtue of contact between the outside diameter of friction wheel 28 with the rotating surface of drive plate 32. Furthermore, this rotation is transferred into driveshaft 20 and into a pair of drive cogs 26.

Drive plate 32 is attached to a drive plate hanger 33. Drive plate hanger 33 is free to be moved laterally on a hanger rod 31. This is accomplished by an operator controlling a shift control cable 37. Movement of drive plate hanger 33 alters the relationship of the contact patch of friction wheel 28 and the center of drive plate 32.

As the contact patch is moved toward the outside diameter of drive plate 32; the rotational speed of cogs 26 increases. As the contact patch is moved toward the center of drive plate 32; the rotational speed of cogs 26 decreases.

This increase and decrease of cogs 26 rotational speed subsequently increases or decreases the ground speed of the mower.

Contact of ground engaging wheels 24 and cogs 26 is controlled by the operator. The wheel support 34 is designed to allow the operator to pivot ground engaging wheels 24 forward into cogs 26 to provide drive to the ground engaging wheels 24. Conversely the operator can choose to disengage ground engaging wheels 24 from cogs 26 to allow for a neutral or disengaged position. Wheel support 34 is illustrated in engaged position 34A.

The movement of ground engaging wheels 24 into cogs 26 (rather than the movement of cogs 26 into ground engaging wheels 24) is what differentiates this design from the prior art and allows for the use of a variable drive friction wheel.

Conclusion, Ramifications, and Scope

Accordingly, the reader will see that the drive system of this invention allows for the use of a multi-ratio friction wheel drive to the rear wheels of a high-wheel mower, is of simple and durable construction, and is easily manufactured.

Furthermore the drive system has the additional advantages in that;

It permits the operator to easily choose different ground speeds;

It permits the operator to change ground speeds while under operation;

It allows the operator to easily disengage the drive system;

It allows the operator to use the mower freely as a manual push mower with the drive disengaged;

It allows for simple and easy maintenance and service.

Although the description above contains many specificities, these should not be construed as limiting the scope of the invention but as merely providing illustrations of some of the presently preferred embodiments of this invention. For example, the drive could use other means of moving the drive plate or friction wheel; the cogs could be replaced with gears, etc.

Thus the scope of the invention should be determined by the appended claims and their legal equivalents, rather than by the examples given.

I claim:

1. A drive system suitable for propelling a high-wheel lawnmower, comprising:
   (a) a rotating drive shaft
   (b) a chassis
   (c) said rotating driveshaft mounted in said chassis in a fixed position
   (d) two ground engaging wheels mounted on a wheel support
   (e) said wheel support having means for moving said ground engaging wheels into contact with said driveshaft.

* * * * *